United States Patent [19]

Saito et al.

[11] 4,253,128

[45] Feb. 24, 1981

[54] DUAL SPRING LOADED OPERATING MECHANISM FOR A TAPE RECORDER

[75] Inventors: Shoichi Saito, Tokyo; Hiroyuki Yamada, Hino, both of Japan

[73] Assignee: Olympus Optical Company, Ltd., Tokyo, Japan

[21] Appl. No.: 47,890

[22] Filed: Jun. 12, 1979

[30] Foreign Application Priority Data

Jun. 12, 1978 [JP] Japan .................................. 53-70614

[51] Int. Cl.³ ........................ G11B 15/18; G11B 15/62
[52] U.S. Cl. ............................... 360/130.3; 360/130.2
[58] Field of Search ................ 360/96.1, 130.1, 130.3, 360/130.31, 130.32, 104, 109, 69, 71, 96.3, 96.4, 96.5, 96.6

[56] References Cited

U.S. PATENT DOCUMENTS 3,800,324  3/1974  Nakamichi .......................... 360/96.1

*Primary Examiner*—John H. Wolff

*Attorney, Agent, or Firm*—Toren, McGeady and Stanger

[57] ABSTRACT

A tape recorder capable of pressing a pinch roller against a capstan shaft with a slight pressing force in the pause state which includes an operation lever reciprocally moved by interlocking with recording, reproducing and stopping operations; a rotational lever rotated by interlocking with the operational lever and effected by a predetermined biasing force; a pinch roller supporting metal fitting interlocking only with the rotation in response to the recording or reproducing operation of the rotational lever and given the biasing force as a force pressing the pinch roller against the capstan shaft; a small spring having a comparatively small biasing force interposed between the supporting metal fitting and the rotational lever; and a play lever reciprocally moved by interlocking with the recording, reproducing and stopping operations, so as to rotate the pinch roller supporting metal fitting and to make the pinch roller contact the capstan shaft.

1 Claim, 2 Drawing Figures

DUAL SPRING LOADED OPERATING MECHANISM FOR A TAPE RECORDER

BACKGROUND OF THE INVENTION

The present invention relates to a tape recorder capable of pressing a pinch roller against a capstan shaft with a slight pressing force under the state of a temporary stop on the way to recording or reproduction, that is, the state of a pause.

Some tape recorders are provided with a so-called pause function for temporarily stopping a tape from running during recording or reproduction.

As an example of such tape recorder, a motor drive circuit is cut off as a pinch roller is pressed against a capstan shaft and a tape running is temporarily stopped.

If a pinch roller is pressed against a capstan shaft with a large pressing force at the time of recording or reproduction during the state of a pause, the pressing force in such a case is considerably larger, so that the pinch roller becomes deformed by the pressing force against the capstan shaft when the pausing state is continued for a long time, and then thereafter, the tape running cannot be performed smoothly, and recording and reproduction become unstable in characteristic.

In order to eliminate such a disadvantage, a tape recorder has been proposed where tape running is temporarily stopped by cutting out a motor drive circuit and at the same time the pinch roller is separated from a capstan shaft.

If the pinch roller is separated from the capstan shaft under the state of a pause, a tape is displaced downward by its own weight caused by slackened tension of the tape. When the tape recorder is restarted under such state, the tape becomes unstable in characteristic for recording and reproduction on that portion because the tape is started from the displaced state.

SUMMARY OF THE INVENTION

An object of the present invention is to eliminate the above disadvantages of conventional tape recorders.

Another object of the present invention is to provide a tape recorder which can prevent the deformation of the pinch roller by pressing the pinch roller against a capstan shaft with a slight force when it is under the state of a pause and also can prevent the displacement of the tape, thereby stabilizing the characteristic at the time of recording and reproduction.

According to the present invention the tape recorder comprises an operation lever reciprocally moved by interlocking with recording, reproducing and stopping operations; a rotational lever rotated by interlocking with the operational lever and effected by a predetermined biasing force; a pinch roller supporting metal fitting interlocking only with rotation in response to the recording or reproducing operation of the rotational lever and providing the biasing force as a pressure force directing the pinch roller against the capstan shaft; a small spring having a comparatively small biasing force interposed between the supporting metal fitting and the rotational lever; and a play lever reciprocally moved by interlocking with the recording, reproducing and stopping operations, so as to rotate the pinch roller supporting metal fitting and to make the pinch roller contact the capstan shaft. The operation lever is only stopped temporarily on the way of recording or reproduction, the interlocking action of the supporting metal fitting with the rotation lever is released, and the pinch roller is pressed against the capstan shaft by the biasing force of the spring.

DESCRIPTION OF THE PREFERRED EMBODIMENT

Figure 1:
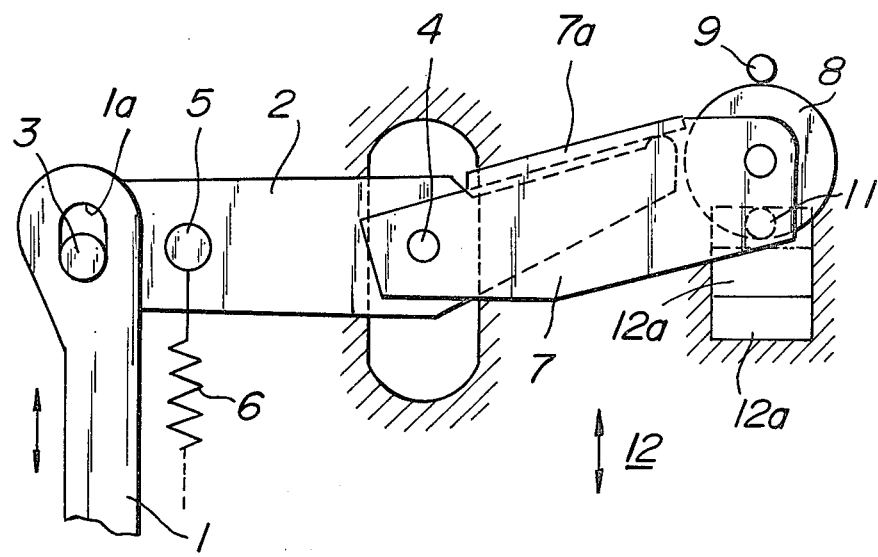
FIG. 1 is a plan view showing an outlined construction of the essential part of a tape recorder according to the present invention.

Referring now to FIG. 1 one embodiment of a tape recorder according to the present invention will be described. In FIG. 1, reference numeral 1 is an operation lever, and this lever 1 is interlocked with recording, reproducing and stopping operations and is linearly and reciprocally moved in the direction of the arrow shown in FIG. 1 alongside the lever. The illustrated embodiment shows the lever 1 in the state of moving downwardly, that is, the state of recording or reproducing state. The lever 1 is also interlocked with the stopping operation against a pause operation.

At an end portion of the lever 1 an elongated hole is formed extending in the axial direction and into the elongated hole 1a a pin 3 secured on a rotational lever 2 is inserted.

The rotational lever 2 is arranged at a right angle to the operation lever 1 and is rotatably supported about an axis 4 at its center portion, so that the lever 2 is rotated in response to the linear reciprocating movement of the operation lever 1. Adjacent the illustrated end of the operation lever 1, the rotational lever 2 is provided with a spring hook portion 5, and a tension spring 6 is secured to the spring hook portion 5. The spring 6 determines the pressing force of a pinch roller 8 against a capstan shaft 9, which will be explained later on, at the time of recording or reproduction, and the rotational lever 2 is rotated and biased in the counterclockwise direction by this tension force.

Figure 2:
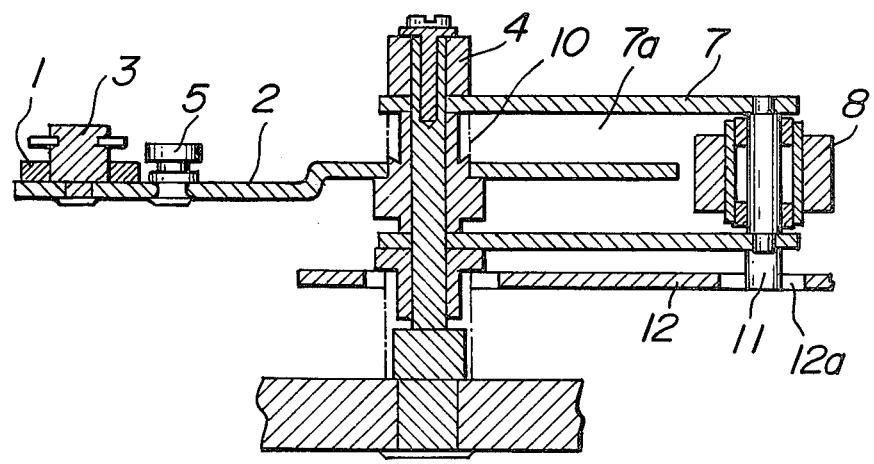
FIG. 2 is a cross-sectional view of the construction shown in FIG. 1.

Reference numeral 7 is a pinch roller supporting metal fitting, and this pinch roller supporting metal fitting 7 is formed into a U-shape, one end of which rotatably supports a pinch roller 8 and the other end rotatably pivots around the axis 4. In this case, the supporting metal fitting 7 positions a U-shaped bottom surface 7a on the side of a capstan shaft as illustrated, an end of the rotational lever 2 is in contact with the bottom surface 7a and the pinch roller 8 is in contact with the capstan shaft 9 by interlocking with the rotation of the rotational lever 2 in the counterclockwise direction. FIG. 1 shows this state. A spring 10 is secured between the supporting metal fitting 7 and the rotational lever 2, as shown in FIG. 2. The spring 10 determines a pressing force of the pinch roller 8 against the capstan shaft 9 under the state of a pause, and the supporting metal fitting 7 is rotated and biased in the counterclockwise direction shown in FIG. 1 against the rotational lever 2 by its deviation force. In this case, the pressing force of the pinch roller 8 under the state of a pause is set less than ½ of the pressing force at the time of the above-described recording or reproduction.

The supporting metal fitting 7 is provided with a downwardly extending pin 11, upwardly as shown in FIG. 2. The pin 11 is inserted into a through-hole 12a of a play lever 12.

The play lever 12 with a magnetic head (not shown) thereon interlocks with the recording, reproducing and stopping operations, and moves linearly and reciprocally in the direction of an arrow shown in FIG. 1, so that the lever 1 advances the magnetic head to a tape position when recording or reproducing, and simultaneously rotates the supporting metal fitting 7 through the pin 11 in the counterclockwise direction so as to make the pinch roller 8 contact the capstan shaft 9, to withdraw the magnetic head when stopping, simultaneously to rotate the supporting metal fitting 7 through the pin 11 in the clockwise direction, and to separate the pinch roller 8 from the capstan shaft 9. FIG. 1 shows the lever 12 moved upwardly under the state of recording and reproduction state, in which the magnetic head (not shown) is advanced and the pinch roller 8 is simultaneously placed into contact with the capstan shaft 9. In this case, the play lever 12 remains interlocked with the recording and reproducing operations against the pause operation.

The action of the tape recorder according to the present invention constructed as described above will be explained hereinafter. As shown in FIG. 1, when the operation lever is in the illustrated state by interlocking with the recording or reproducing operation, the rotational lever 2 is rotated in the counterclockwise direction around the axis 4 and its end presses against the pinch roller supporting metal fitting 7. In this case, the play lever 12 is also interlocked by the recording or reproducing operation and remains in the state shown in FIG. 1, so that the supporting metal fitting 7, interlocked with the rotational lever 2, is rotated in the counterclockwise direction and presses the pinch roller 8 against the capstan shaft 9.

In this case, the tension force of the spring 6 is applied to the rotational lever 2 rotating is in the counterclockwise direction. Therefore, the tension force in this case acts as a pressing force via the pin 4 on roller 8.

When the pause operation is performed from the above state, the operation lever 1 is moved upwardly only as shown in FIG. 1. Then, the rotational lever 2 is rotated around the axis 4 in the clockwise direction, and the pressure of the pinch roller supporting metal fitting 7 is released at the end. However, in this case, the play lever 12 still remains in the state shown in FIG. 1 against the pause state, so that, in this state, the pinch roller supporting metal fitting 7 is rotated in the counterclockwise direction by the bias force of the spring 10 and the pinch roller 8 is made into contact with the capstan shaft 9. That is, under such pause state, the pinch roller 8 is pressed to the capstan shaft 9 by the slight biasing force of the spring 10.

Then, when operation is switched from the pause to the above recording or reproducing state, if the stop operation is performed, the operation lever 1 is moved upwardly as shown in FIG. 1 and at the same time, the play lever 12 is moved downwardly as shown in FIG. 1, so that the rotational lever 2 interlocked with the operation lever 1 is rotated in the clockwise direction around the axis 4 so as to release the pressure of the pinch roller metal fitting 7 at the end. Further, with the downward movement of the play lever 12, as shown in FIG. 1, the through-hole 12a is also moved to the position shown by a one dot dash line as illustrated. Thus, the pinch roller supporting metal fitting 7 is rotated in the clockwise direction by the pin 11, and the pinch roller 8 is separated from the capstan shaft 9.

With such construction, in the pause state on the way to the recording or reproduction, the pinch roller can be brought into contact with the capstan shaft with a slight pressing force, so that the deformation of the pinch roller is prevented even if the pause state is continued for a long time as compared to conventional operation in which the pinch roller is pressed against the capstan shaft with a large pressing force during recording or reproduction, and as a result, instability in characteristic at the time of recording or reproduction caused by such deformation can be avoided. Further, as compared with the condition in which the pinch roller is separated from the capstan shaft simultaneously with the pause state, it becomes possible to avoid the disadvantage that the tape is displaced downward by its own weight. Therefore, the subsequent re-start of recording or reproduction stably can be carried out in a stable manner.

The present invention is not limited to the above embodiment but can be modified without departing from the essential feature of the present invention.

As stated hereinbefore, the present invention provides a tape recorder for stabilizing the characteristic at the time of recording or reproduction by pressing a pinch roller against a capstan shaft with a slight force in the pause state, thereby preventing not only the deformation of the pinch roller but also the displacement of the tape.

What is claimed is:

1. A tape recorder comprising an operational lever reciprocally moved by interconnecting with recording, reproducing and stopping operations; a rotational lever rotated by the operational lever and effected by a predetermined spring bias force; a pinch roller supporting metal fitting interlocking only upon rotation in response to the recording or reproducing operation of the rotational lever and with the bias force acting as a pressure force to bias the pinch roller against a capstan shaft; a second relatively smaller spring having a comparatively smaller bias force interposed between the supporting metal fitting and the rotational lever; and a head supporting play lever reciprocally moved by interlocking the recording, reproducing and stopping operations, so as to rotate the pinch roller supporting metal fitting to cause; the pinch roller to contact the capstan shaft, whereby the operational lever is only stopped temporarily on the way to recording or reproduction, the interlocking action of the support metal fitting to the rotation lever is released, and the pinch roller is pressed to the capstan shaft by the bias force of the second spring.

* * * * *